Feb. 27, 1968  R. P. DELLAQUILA ET AL  3,370,891
CIGAR CONVEYOR
Filed July 15, 1966
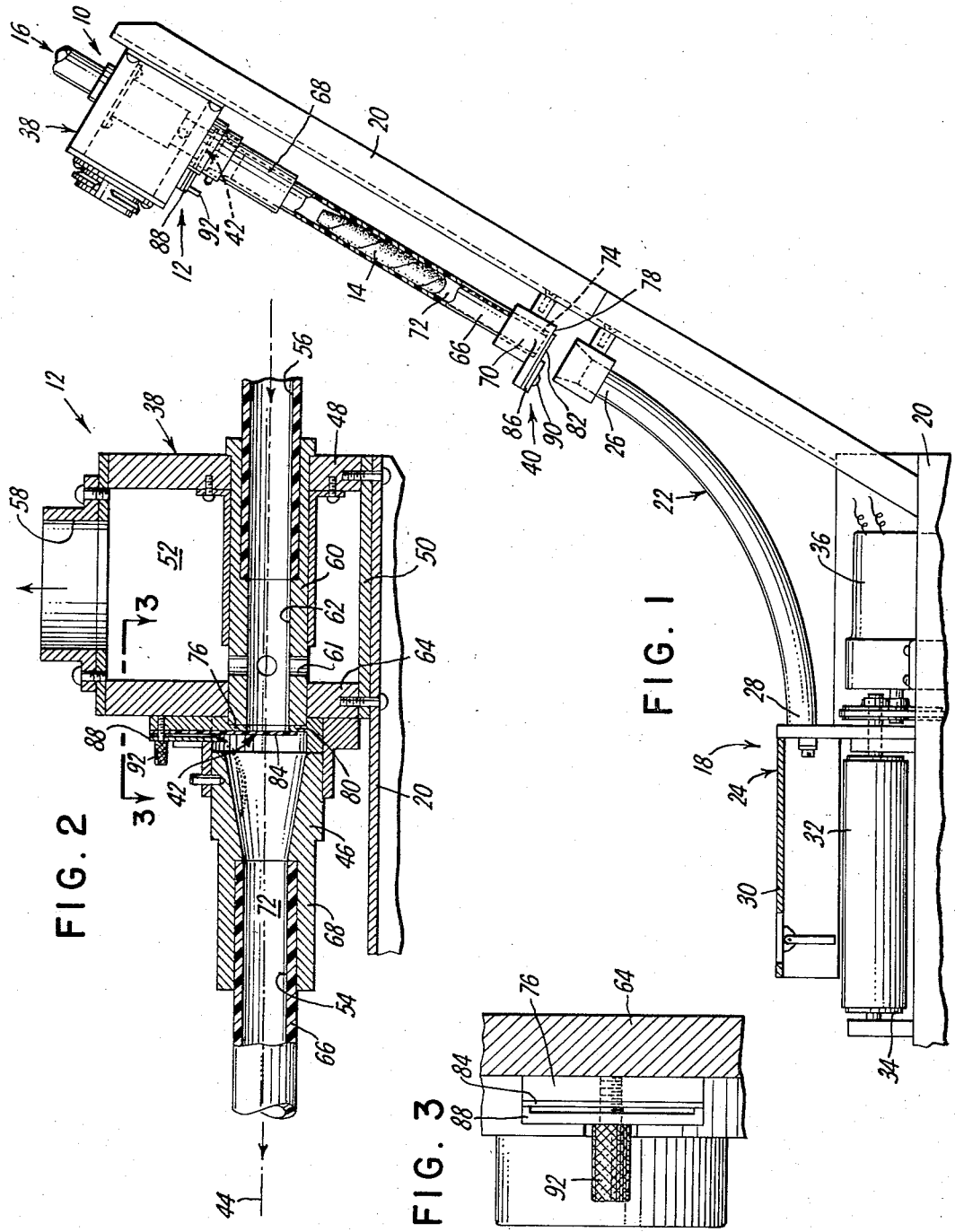
INVENTORS
ROBERT P. DELLAQUILA
JOHN L. INGALLS
BY
Thomas W. Kennedy
ATTORNEY 3,370,891
CIGAR CONVEYOR
Robert Paul Dellaquila, Queens, and John Lee Ingalls, Green Lawn, N.Y., assignors to American Machine & Foundry Company, a corporation of New Jersey
Filed July 15, 1966, Ser. No. 565,431
9 Claims. (Cl. 302—62)

ABSTRACT OF THE DISCLOSURE

A tubular conveyor for propelling rod-like articles under pneumatic force having a terminal air-lock for discharging the article, the air-lock formed of an elongated tube having a flap at each end normally sealing the tube under influence of the pneumatic force and being operable on passage of the article.

The present invention relates to a pneumatic cigar-conveying apparatus, and particularly to a pneumatic cigar-conveying apparatus airlock device.

A prior-art airlock device is described in U.S. Patent No. 775,949. Said prior-art airlock device includes a hollow outer body and a pair of spaced valves connected thereto.

One problem with said prior-art airlock device is that it requires an elaborate cigar-timing and valve-actuating mechanism for valve operation.

In accordance with one embodiment of the present invention, a pneumatic cigar-conveying apparatus airlock device is provided, in which the need for an elaborate cigar-timing and valve-actuating mechanism is avoided, by using light-weight cigar-actuated valves.

Accordingly, it is one object of the present invention to provide a pneumatic cigar conveying apparatus airlock device, which does not require elaborate auxiliary mechanisms, and in which air leakage is minimized, and in which cigar damage is minimized.

To the fulfillment of these and other objects, the invention provides an airlock device comprising a hollow outer body having a longitudinal axis and having a pair of axially-spaced first and second end walls and having a third peripheral wall, which together form a substantially airtight first chamber therebetween, with said pair of end walls respectively having first and second passages opening into said chamber and with said third peripheral wall also having a third passage opening into said chamber, and also comprising a pair of axially-spaced first and second shutoff valves disposed in said first passage forming a second substantially airtight chamber therebetween with said second valve being disposed between said first and second chambers for communication therebetween when said second valve is open.

Other objects of the invention will become apparent upon reading the following description and the accompanying drawings, wherein like parts are designated by like numerals throughout the several views, and wherein:

FIGURE 1 is an elevation view of a pneumatic cigar-conveying apparatus embodying features of the present invention;

FIGURE 2 is an enlarged cutaway view of a portion of FIGURE 1; and

FIGURE 3 is a sectional view along line 3—3 of FIGURE 2.

Referring to FIGURE 1, one embodiment of the present invention is a cigar-conveying apparatus 10. Apparatus 10 includes a suction-type airlock device 12 for generating an airflow and for conveying a cigar 14 therethrough. Apparatus 10 also includes a pneumatic conveyor tube 16, which is connected to airlock 12 for supplying cigar 14 thereto, and includes a collector means 18, which is also connected to airlock 12 for receiving cigar 14 therefrom.

Collector 18 has a supporting base 20 on which airlock 12, tube 16 and collector 18 are mounted. Collector 18 also includes a curved guide tube 22 for conveying cigar 14 by gravity from airlock 12, and a belt conveyor 24 for receiving cigar 14 from guide tube 22. Tube 22 has an inlet end 26, which receives cigar 14 from airlock 12, and an outlet end 28, which is connected to belt conveyor 24. Belt conveyor 24 includes a cigar-dispensing bracket 30, which is connected to tube outlet 28 for stopping the longitudinal movement of cigar 14. Conveyor 24 also includes a belt 22 on which cigar 14 is positioned by bracket 30 and on which cigar 14 is carried in a direction transverse to tube 22. Belt 32 has a drive roller 34 and a motor 36, which are mounted on support 20.

According to the invention, airlock 12 includes a hollow outer body 38 and a pair of first and second valves 40, 42, which are connected to outer body 38.

Outer body 38 has a longitudinal axis 44, and has a pair of axially-spaced first and second end walls 46, 48, and has a third peripheral wall 50, which together enclose a substantially airtight chamber 52. Walls 46, 48, 50 respectively have first, second and third passages 54, 56, 58, which respectively open into chamber 52. Passages 54, 56 are preferably coaxial along axis 44.

Outer body 38 also has a hollow perforated tube 60, which is disposed in chamber 52 coaxially therewith and which is supported by walls 46, 48 for guiding cigar 14 therebetween. Tube 60 has a plurality of perforations 61. Tube 60 also has a fourth passage 62, which interconnects passages 54, 56.

Wall 46 (FIGURE 2) includes a flat vertical wall portion 64 and also an elongate tubular wall portion 66. Passage 54 extends through both portions 64, 66. Wall portion 66 has an upstream flange 68, which is fixedly connected to wall portion 64 and also has a downstream flange 70, which faces collector inlet portion 26.

Passage 58 is connected to a suction pump (not shown) to provide an airflow that passes in through passage 56, through chamber 52 and out through passage 58. In FIGURE 1, cigar 14 is shown passing through passage 54. For this purpose, the aforementioned airflow, which passes through passage 56, also urges cigar 14 through chamber 52 and out through passage 54.

Valves 40, 42, which are preferably open-close shutoff type valves, are disposed in passage 54, are axially-spaced along axis 44, and form a second substantially air-tight chamber 72 therebetween.

Valves 40, 42 which are substantially identical in construction, include respective ring portions 74, 76. Rings 74, 76 are disposed in passage 54 forming annular shoulders therein and are integral with wall 46. Rings 74, 76 also have respective substantially flat end bearing surfaces 78, 80 that are disposed on the downstream sides thereof.

Valves 40, 42 also include respective hinge-type flaps 82, 84, which are rotatably connected to wall 46. Flaps 82, 84 are preferably composed of a resilient material, and preferably have a thickness to width ratio of less than 10%, in order to minimize damage to cigar 14 during impact therewith. Flaps 82, 84 also overlap respective bearing surfaces 78, 80 for good sealing engagement therewith. Flaps 82, 84 also have respective support bars 86, 88 with respective support screws 90, 92 for connection to wall 46.

With this construction, chamber 52 normally has a pressure which is less than atmospheric pressure. In operation, flap 82 is urged against surface 78 by atmospheric pressure when flap 84 is open; and similarly flap 84 is urged against its corresponding surface 80 when flap 82 is open. In this way, during passage of cigar 14 through airlock 12, the amount of air leaking into chamber 52 is substantially minimized.

In summary, this invention provides a pneumatic cigar-conveying apparatus airlock device, which does not require elaborate auxiliary mechanisms, and which minimizes air leakage and cigar damage.

While the present invention has been described in a preferred embodiment, it will be obvious to those skilled in the art that various modifications can be made therein within the scope of the invention. For example, airlock 12 can be used as a dispenser for supplying cigars to a pneumatic tube instead of a collector for receiving cigars from a pneumatic tube by reversing the direction of flaps 82, 84 and by connecting a positive pressure pump instead of a suction pump to passage 58 and by using passage 56 as the outlet and by using passage 54 as the inlet. It is intended that the appended claims cover all such modifications.

What is claimed is:
1. An airlock device for use with a conveyor or rod-like articles comprising:
   a hollow outer body having a longitudinal axis and having a pair of axially-spaced first and second end walls and having a third peripheral wall which together form a substantially airtight first chamber therebetween, said pair of end walls respectively having first and second passages opening into said chamber and said peripheral wall having a third passage opening into said chamber;
   an elongated guide member disposed between said first and second walls for guiding said articles through said first chamber, and
   a pair of axially-spaced first and second shutoff valves disposed in said first passage forming a second substantially airtight chamber therebetween with said second valve being disposed between said first and chambers.

2. The airlock device as claimed in claim 1, comprising:
   a pneumatic conveyor tube connecting to said airlock second passage for supplying an article thereto;
   pneumatic supply means connected to said second passage for creating a pneumatic force with said second passage; and
   a collector means connecting to said airlock first passage for receiving said article therefrom.

3. A cigar conveyor as claimed in claim 1, in which said collector includes:
   an article guide member having an inlet end connecting to said airlock first passage and having an outlet end opposite thereto; and
   a belt conveyor having a belt with a drive means and having a dispenser disposed between said guide tube outlet end and said belt.

4. An airlock device as claimed in claim 1, in which each said valve includes:
   a ring portion disposed in said first passage and fixedly connecting to said first wall forming an annular shoulder therein and having a substantially flat end bearing face; and
   a hinge-type flap member connecting to said first wall and overlapping said end bearing face.

5. An airlock device as claimed in claim 1, in which said guide member is a perforated tube having a fourth passage disposed between an interconnecting said first and second passages.

6. The device as claimed in claim 2, in which
   said collector includes an article guide member having an inlet end connecting to said airlock first passage and having an outlet end opposite thereto and also includes a belt conveyor having a belt with a drive means and also having a dispenser disposed between said guide tube outlet end and said belt, and in which
   said first end wall adjacent said first passage includes a substantially flat wall portion and includes an elongate tubular wall portion integral therewith with said first passage extending through both said portions, and in which
   each said valve includes a ring portion disposed in said first passage and fixedly connecting to said first wall with a substantially flat end face and a hinge-type flap member connecting to said first wall and overlapping said end face, and in which
   said outer body also has an elongate perforated guide tube disposed in said first chamber between said first and second walls.

7. Apparatus for conveying rod-like articles comprising a tubular conveyor having an exit terminus and pneumatic means for propelling said articles therethrough, an air lock device located at said exit terminus for discharging said articles from said conveyor, said air lock device comprising a tubular guide having a length greater than an individual one of said articles and hinge type flap members covering each end of said guide, said flaps being normally disposed to seal said ends on application of said pneumatic means and to independently open on passage of said articles thereby.

8. The apparatus according to claim 6 including a ring member disposed at each end of the tubular guide forming an annular shoulder therewith and having a substantially flap end bearing face, the hinge type flap members overlapping said end bearing face.

9. Apparatus for conveying rod-like articles comprising a tubular conveyor having an exit terminus and vacuum means for propelling said articles therethrough, an air-lock device located at said exit terminus for discharging said articles thereon, said air-lock device being disposed in a vertical position to permit articles to fall therethrough under the effect of gravity, said air-lock comprising a tubular guide member having a length greater than an individual one of said articles, an annular shoulder at each end forming a bearing surface and a resilient hinge-type flap mounted to overlap each of said bearing surfaces, said flaps being disposed to normally seal the ends of said tubular guide on application of vacuum to said conveyor and to independently open on passage of said articles thereby.

References Cited

UNITED STATES PATENTS

| | | | |
|---|---|---|---|
| 824,585 | 6/1906 | Rieth | 302—62 |
| 1,753,987 | 4/1930 | Hohne | 243—21 |
| 1,796,747 | 3/1931 | Colby | 302—62 |
| 2,470,744 | 5/1949 | Korn | 302—62 |

RICHARD E. AEGERTER, *Primary Examiner.*

EVON C. BLUNK, *Examiner.*

H. C. HORNSBY, *Assistant Examiner.*